(12) United States Patent
Laughlin (10) Patent No.: US 6,190,487 B1
(45) Date of Patent: Feb. 20, 2001

(54) MEDICAL POSITIONER AND METHOD FOR ITS MANUFACTURE

(76) Inventor: Kevin E. Laughlin, 3559 Gordon Rd., Elkhart, IN (US) 46516

(*) Notice: Under 35 U.S.C. 154(b), the term of this patent shall be extended for 0 days.

(21) Appl. No.: 09/190,646

(22) Filed: Nov. 12, 1998

Related U.S. Application Data (60) Provisional application No. 60/065,829, filed on Nov. 17, 1997.

(51) Int. Cl.[7] ............................... A61L 2/00; B32B 31/26
(52) U.S. Cl. .................... 156/213; 156/212; 156/229; 156/292; 156/308.4; 428/71; 428/76; 264/101; 264/292
(58) Field of Search ..................................... 156/212, 213, 156/214, 217, 229, 292, 304.6, 308.4; 264/101, 292; 428/71, 76

(56) References Cited

U.S. PATENT DOCUMENTS

| | | | |
|---|---|---|---|
| 3,849,225 | * 11/1974 | Haertle | 156/213 |
| 5,108,529 | * 4/1992 | Shuert | 156/214 |
| 5,743,979 | * 4/1998 | Lorbiecki | 156/79 |
| 6,027,777 | * 2/2000 | Hirano et al. | 428/35.4 |

* cited by examiner

Primary Examiner—Sam Chuan Yao
(74) Attorney, Agent, or Firm—Baker & Daniels (57) ABSTRACT

A ring shaped medical positioner and method for its manufacture the positioner includes a ring shaped insert wrapped in a surgical vinyl. The vinyl is divided into a first and second pieces, the first piece being formed by forming dyes engaging opposite sides of the vinyl, which is stretched between the dyes and progressively relaxed as the material is drawn into the female forming dye by the male dye and suction. The insert is placed within the formed surgical vinyl. The second piece is a flat disc which is placed over one of the surfaces of the insert and sealed to the edges of the first piece of vinyl to thereby provide a wrinkle free covering which may be easily disinfected for repeated use.

10 Claims, 8 Drawing Sheets

MEDICAL POSITIONER AND METHOD FOR ITS MANUFACTURE

This application claim domestic priority based upon United States Provisional Patent Application Ser. No. 60/065,829 filed on Nov. 17, 1977.

This invention relates to a reusable surgical positioner for supporting body members during surgery, and to a process encasing a polyurethane insert in medical grade vinyl by thermal vacuum forming the vinyl, installing the insert in the vinyl, and sealing the vinyl around the insert to provide a product for reusable use in various health care venues such as surgery.

Surgical positioners are used to position, support and prevent injury to the human body for patients undergoing surgery. These positioners are commonly made out of polyurethane foam, and are discarded after use. For example, donut shaped positioners are used to position the head of a patient during surgery in some procedures, and then discarded.

Such positioners are discarded because it is impossible to insure that the positioner is properly cleaned after use. In order to insure a clean and sterile environment, the foam positioner must be encapsulated in a surgical vinyl, which may be cleaned and disinfected for reuse. Of course, the vinyl cannot be sewn or otherwise attached by processes that punch holes in the vinyl because holes provide areas where bacteria may be lodged and where it is difficult or impossible to clean and disinfect. Prior art positioners using gel filled surgical vinyl are available, but these have proven to be unsatisfactory because the gel conducts heat. Since operating rooms are maintained at a relatively low temperature (usually about 62° F.), the gel filled positioners remain at this temperature, thus draining heat from the patient and retarding circulation in that portion of the body where the positioner is used. Polyurethane foam has heretofore not been covered with surgical vinyl because of difficulties in applying the vinyl to the polyurethane foam in a manner such that wrinkles, creases, etc. in the vinyl covering polyurethane foam, which may harbor harmful bacteria, are eliminated. The present invention relates to a surgical positioner and a method for its manufacture, in which surgical vinyl encapsulates foam rubber in a manner in which creases, wrinkles, etc. are eliminated and heat sealing is used so that sewing, and the resulting needle holes, are eliminated. Accordingly, the positioner can be used repeatedly and disinfected after each use in the same manner in which other operating room appliances are disinfected, that is, by wiping with a cleaning pad which has been dipped in disinfectant.

These and other advantages of the present invention will become apparent from the following description with reference to the accompanying drawings in which.

Figure 1:
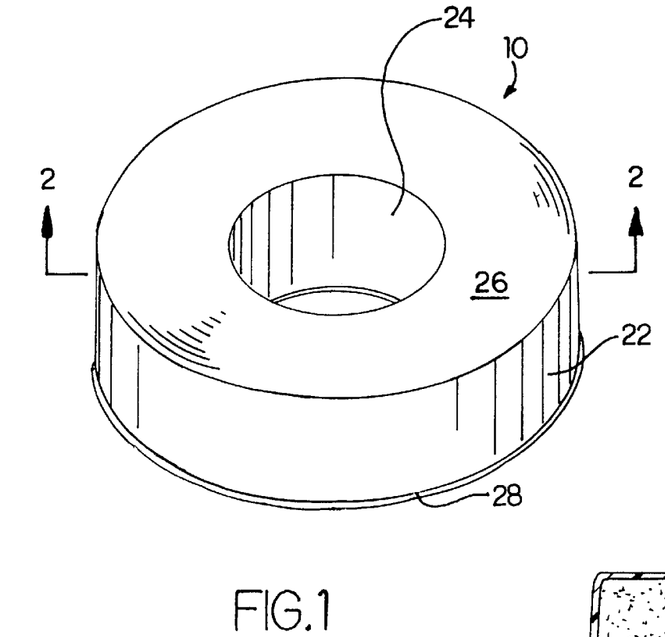
FIG. 1 is a view in perspective of a surgical positioner typical of the type manufactured by the process disclosed herein.
Figure 2:
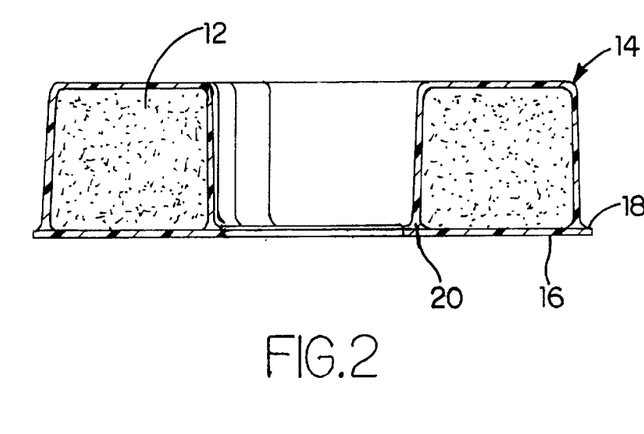
FIG. 2 is a cross sectional view taken substantially along lines 2—2 of FIG. 1.

Referring now to the drawings, a surgical positioner is generally indicated by the numeral 10 and includes an annular ring of polyurethane foam generally indicated by the numeral 12 which is covered by a covering of elastic surgical vinyl consisting of a contoured section 14 that is sealed against a substantially flat portion of surgical vinyl 16. The portions 14 and 16 are sealed to each other around the outer juncture 18 between the members 14 and 16 and also around the inner juncture 20. Accordingly, the positioner 10 includes an outer circumferential surface 22, an inner circumferential surface 24, an upper transverse surface 26, and a lower transverse surface 28. The ring of foam rubber 12 maybe formed in any manner well known to those skilled in the art. The surgical vinyl covering is a thermal formable, polyester backed commercial grade stretchable vinyl, obtainable from Uniroyal, Inc., to which common antibacterial agents have been added.

Referring now to FIGS. 3–6, a blank 30 of the aforementioned surgical vinyl that is to be formed into the upper contoured vinyl member 14 is clamped along its edges by movable clamps 32, through which tension is applied to the blank 30, thereby stretching the blank 30 to a size approximately thirty percent (30%) larger than the nominal size. The blank 30 is sufficiently large that multiple copies of the upper contour member 14 will be formed in a single blank; for example, the blank 30 as illustrated is large enough that four copies of the upper contoured member 14 are formed simultaneously.

Figure 3:
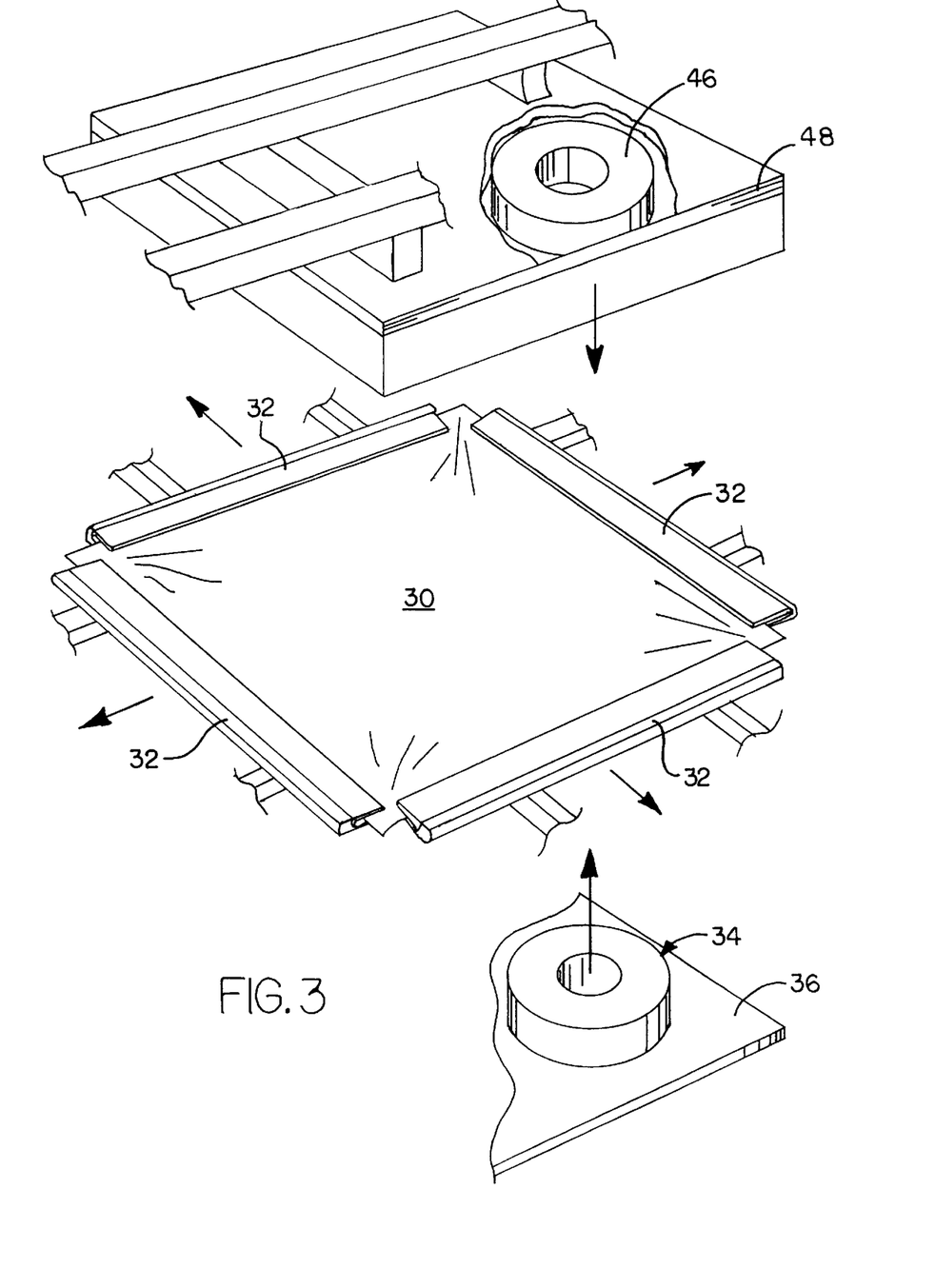
FIG. 3 is an exploded view in perspective of a molding press and blank of surgical vinyl illustrating the manner in which one portion of the vinyl is formed into a shape for encapsulating a foam rubber ring.
Figure 4:
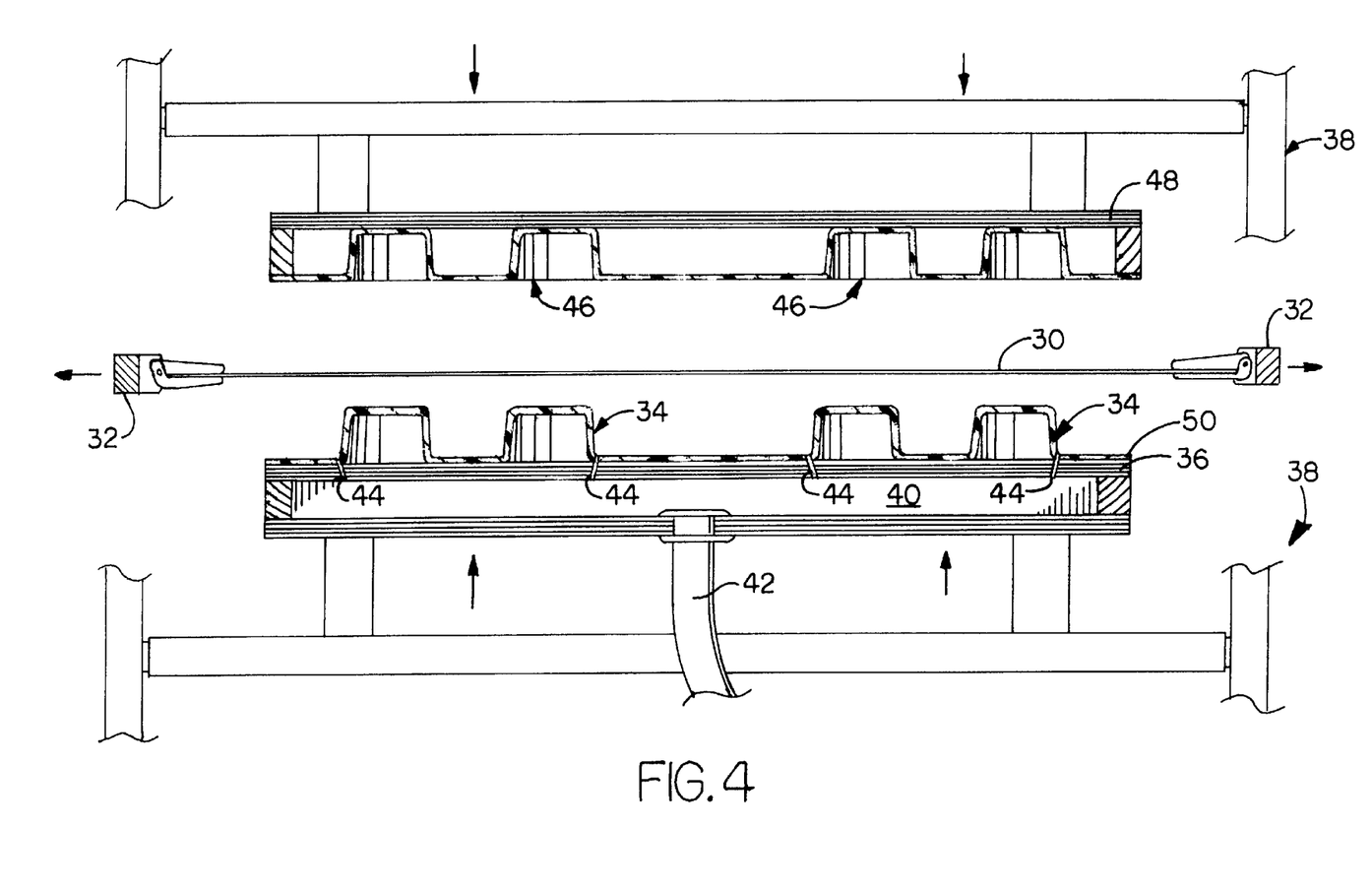
FIG. 4 is cross sectional view of the press illustrated in FIG. 3, the press being shown with the jaws open and the vinyl blank disposed between the jaws.

The blank 30 is stretched between a male die forming member indicated by the numeral 34 which is mounted on lower platen 36 of a press generally indicated by the numeral 38. The lower platen 36 includes a plenum 40 which is connected to a vacuum source (not shown) through vacuum hose 42. The male die forming members 34 are circumscribed by passages 44 that communicate with the plenum 40. Female die members 46 are mounted on upper platen 48 and are adapted to receive the male die member 34 to thereby form the blank 30 into copies of the upper contoured vinyl member 14.

Figure 5:
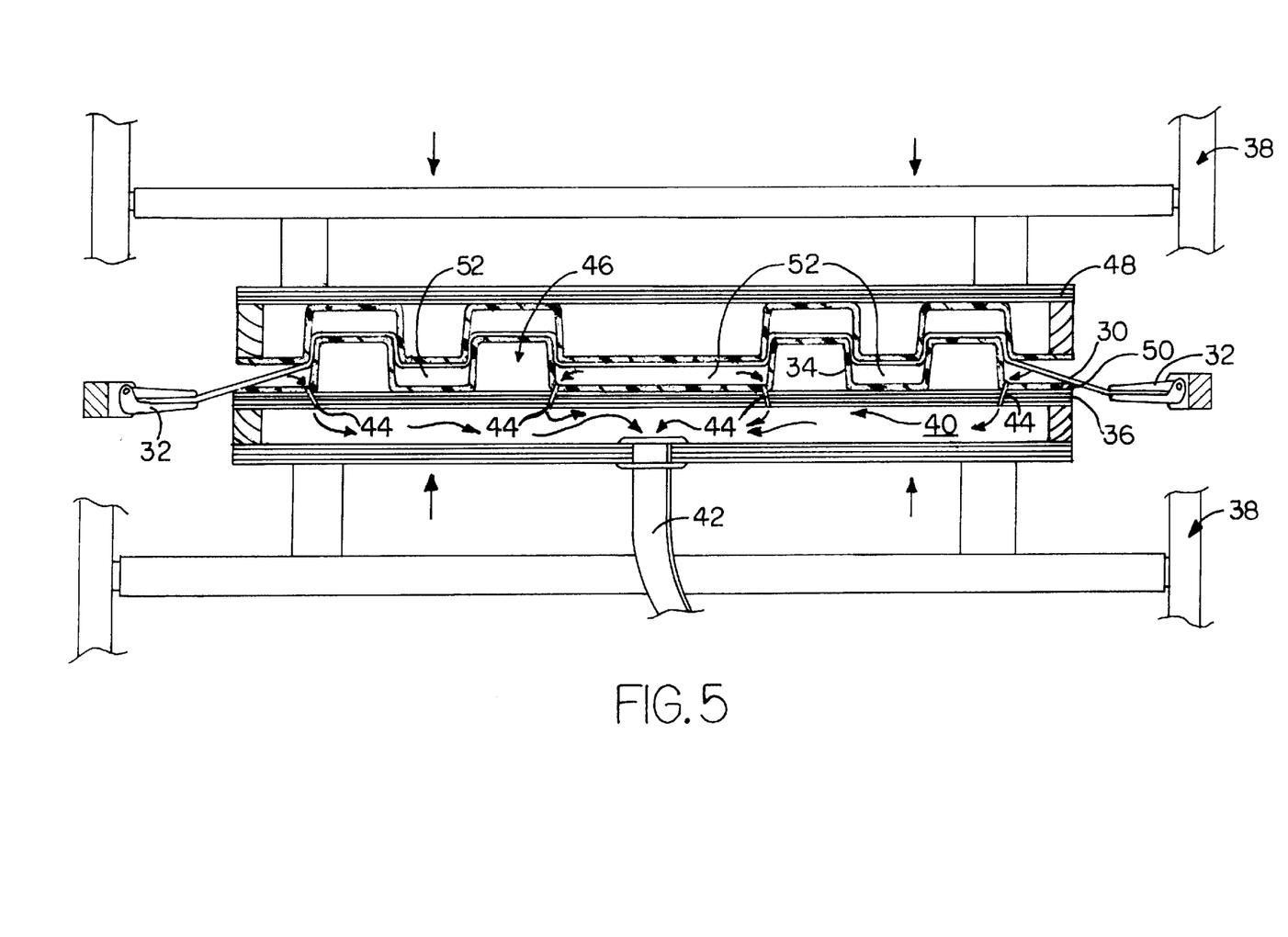
FIG. 5 is a view similar to FIG. 4, but illustrating the platens of the press in a position in which molding of the vinyl is initiated.
Figure 6:
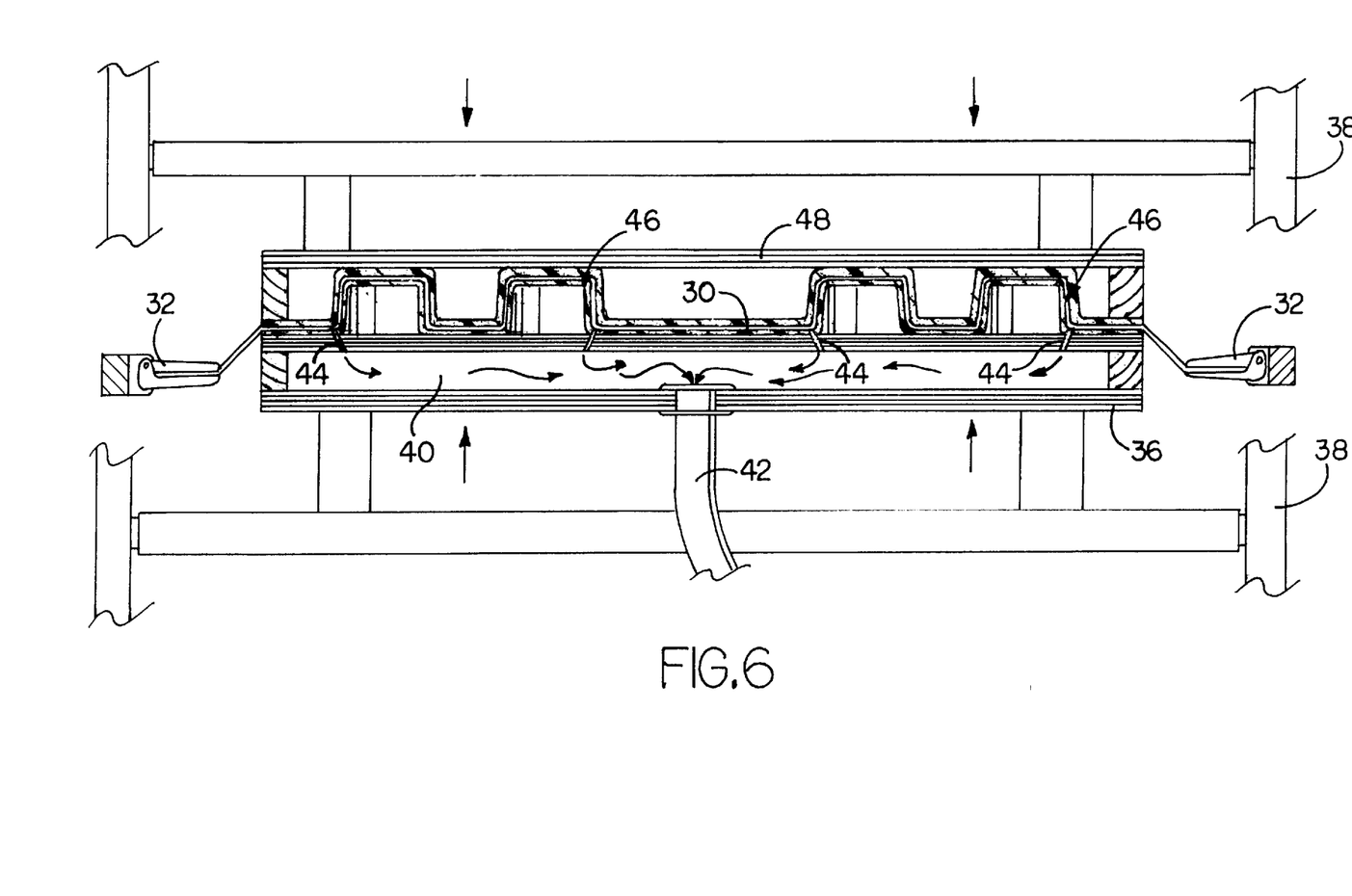
FIG. 6 is a view similar to FIGS. 4 and 5, but illustrating the platens of the press fully closed together.

Accordingly, the upper platen 48 and lower platen 36 are advanced toward one another until the outer peripheral edge 50 of the lower die member is engaged by the vinyl blank 30, as illustrated in FIG. 5, thereby forming a sealed chamber 52 between the blank 30 and the lower die members. Accordingly, suction applied through hose 42 creates a partial vacuum in the plenum 40, thereby drawing air through passages 44 as the male and female die members are brought together. At the same time, the clamps 32 are allowed to move toward one another, thereby progressively relaxing the tension on the blank 30 as the vinyl is forced into the cavities of the dies by a combination of the movement of the male die into the female die member, and by the suction applied through the passages 44. Since the relaxation of the vinyl blank 30 is controlled as the vinyl is forced into the mold, the vinyl can be formed without wrinkles or creases, since the suction applied also assures that the blank is properly drawn around the die members. As discussed above, the vinyl blank 30 is a thermal formed vinyl, so that the dies 34 and 46 are heated, thereby permanently forming the vinyl into the shape of the upper contoured vinyl member 14.

Figure 7:
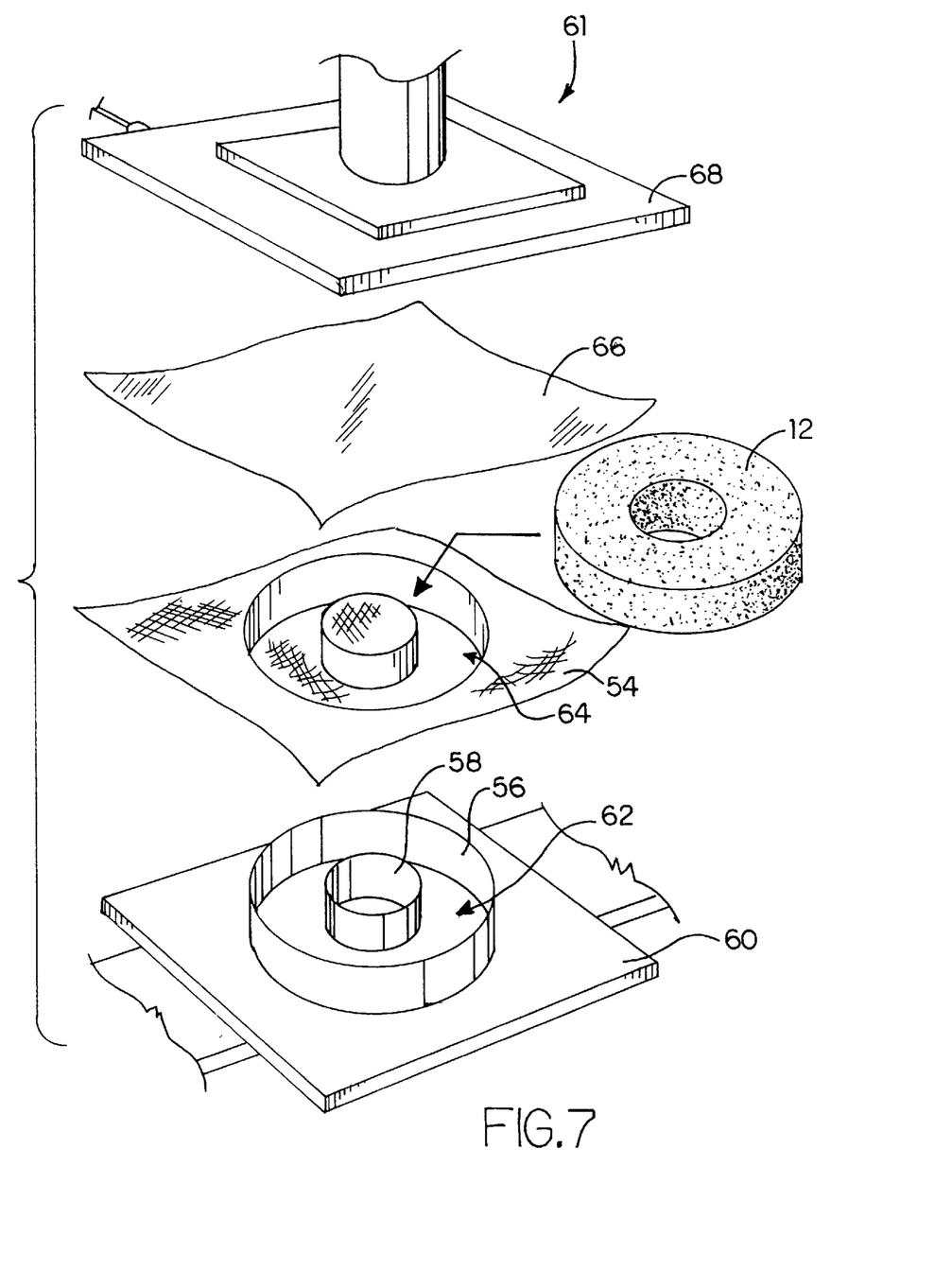
FIG. 7 is an exploded view in perspective illustrating the manner in which the surgical positioner is installed in another press for sealing the surgical vinyl around the foam rubber component.
Figure 8:
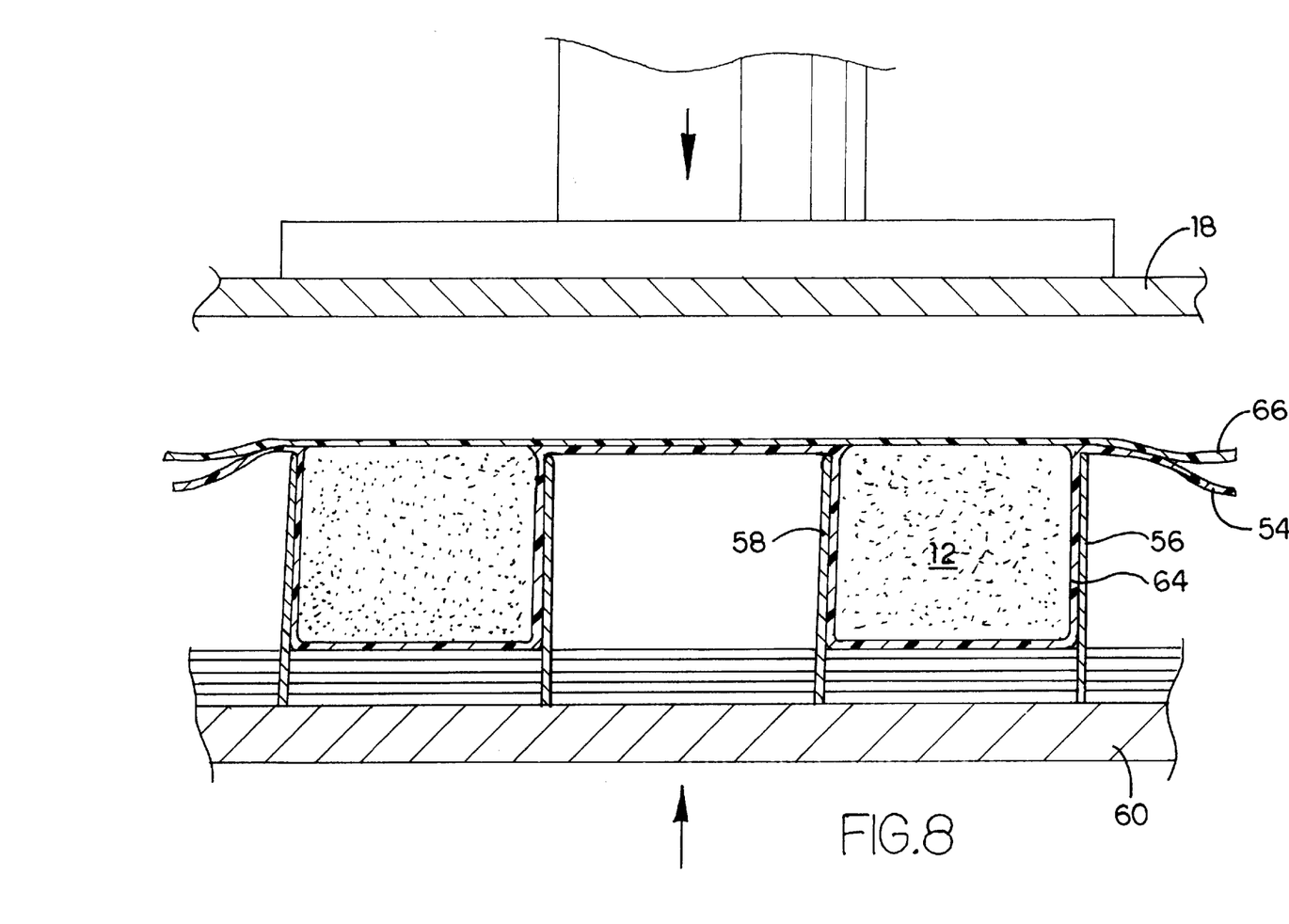
FIG. 8 is a view similar to FIG. 7 but illustrating the components installed in the press with the platens of the press open.
Figure 9:
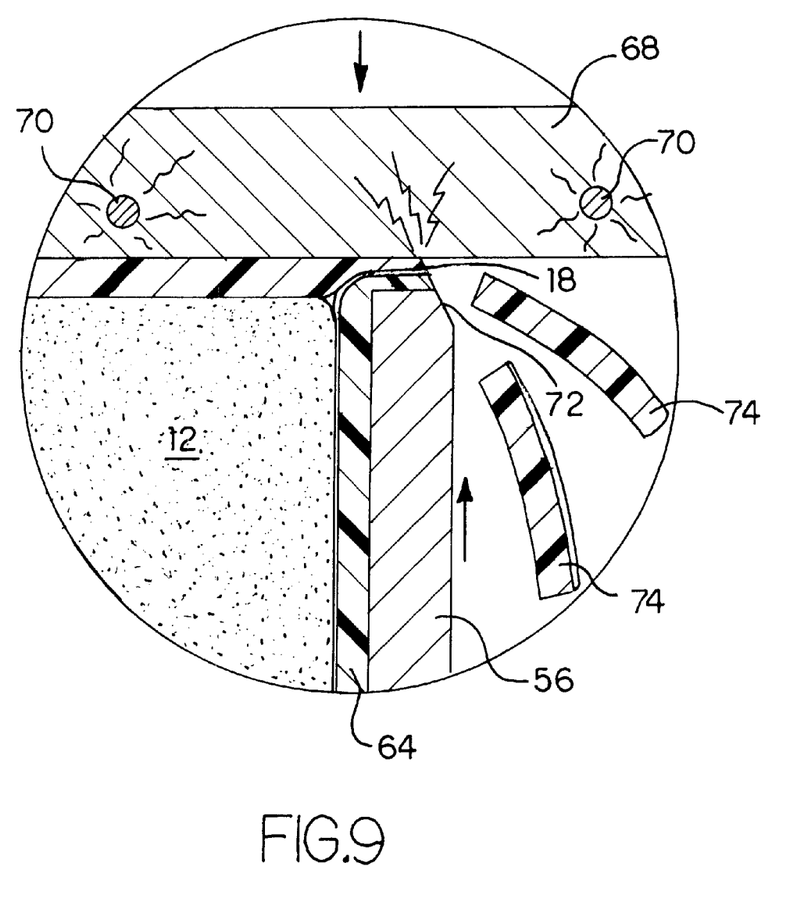
FIG. 9 is an enlargement of one of the corners of the positioner illustrating the manner in which the vinyl is sealed around the foam rubber and the edges of the vinyl are trimmed.

After the upper contoured vinyl members 14 are formed, the press is opened, the formed blank 30 is removed from the press, and the copies of the contoured member 14 are cut from the blank 30, to provide an untrimmed contour member as indicated at 54 in FIG. 7. Forming rings 56, 58 are provided in a lower platen 60 of another press generally indicated by the numeral 61. The forming rings 56, 58 define an annular volume 62 then accepts the contoured portion 64 of the untrimmed formed vinyl member 54. After the contoured portion 64 is installed in volume 62, the foam rubber ring 12 is placed in the contoured portion 64. Unformed sheet 66 is then laid over the untrimmed vinyl blank 54 and foam rubber ring 12, as clearly shown in FIG. 8. The upper platen 68 and lower platen 60 are then advanced toward one another, until the upper platen 68 engages the untrimmed vinyl 66. The upper platen 68 is provided with heating elements 70 (FIG. 9), which heat the vinyl and cause the edge portions 18 to fuse together because of heating and transonic energy applied through the upper platen 68. The upper edges of the rings 56 and 58 are provided with a knife edge 72 which trims off the excess 74 of the untrimmed member 54 and sheet 66. The finished product can then be removed from between the rings 56 and 58.

What is claimed is:

1. A method of manufacturing a medical positioner by wrapping an insert in stretchable material conforming to the shape of said insert without wrinkling and creasing, the method comprising the steps of providing a sheet of stretchable material placing said sheet of stretchable material between a pair of opposed forming dies contoured to the shape of the insert, stretching the sheet before engaging the dies with the sheet, relaxing the stretched sheet as the stretched sheet is drawn into the forming dies at a rate sufficient to permit the stretched sheet to be formed by the dies without wrinkling, engaging the relaxed sheet to configure the relaxed sheet into a shape conforming to a shape of the insert, removing the configured sheet from the dies, placing the insert within the conforming shape of the configured sheet, providing a layer of material, and sealing the layer to the configured sheet to wrap the insert within the configured sheet and the layer.

2. Method of manufacturing a medical positioner as claimed in claim 1, wherein said forming dies include a male die and an opposed female die, the stretch of the sheet being relaxed as the male die engages the sheet within the female die.

3. Method of manufacturing a medical positioner as claimed in claim 2, wherein said sheet is pulled into said female die by vacuum after the sheet is engaged with the female die.

4. Method of manufacturing a medical positioner as claimed in claim 1, wherein said sheet is stretched by engaging clamps on opposite edges of said sheet and then moving said clamps away from one another to stretch said sheet, said clamps being moved toward one another to relax the stretch as the dies form the sheet.

5. Method of manufacturing a medical positioner as claimed in claim 1, wherein said sheet conforming to said insert defines an opening through which the insert is installed in the sheet, and the layer overlies said opening, said sheet and layer having edges sealed to one another to close said opening.

6. Method of manufacturing a medical positioner as claimed in claim 5, wherein said configured sheet with the insert installed therein is placed in a form with the opening facing out of the form, said method including the additional step of applying heat and pressure to the edges of the sheet and the layer to seal said edges together and close said opening.

7. A method of manufacturing a medical positioner by wrapping an insert in stretchable material conforming to the shape of said insert without wrinkling and creasing the method comprising the steps of providing a sheet of stretchable material placing said sheet of stretchable material between a pair of opposed forming dies contoured to the shape of the insert, engaging said sheet with clamps on opposite sides of the sheet, moving said clamps away from one another before engaging the dies with the sheet to stretch said sheet, moving the clamps toward one another to relax the sheet as the sheet is drawn into the dies at a rate sufficient to permit the stretched sheet to be formed by the dies without wrinkling, engaging the relaxed sheet to configure the relaxed sheet into a shape conforming to the shape of the insert removing the configured sheet from the dies placing the insert within the conforming shape of the configured sheet, providing a layer of material and sealing the layer to the configured sheet to wrap the insert within the configured sheet and the layer.

8. Method of manufacturing a medical positioner as claimed in claim 7, wherein said forming dies include a male die and an opposed female die, said clamps being moved toward one another as the male die engages the stretched sheet into the female die, said sheet being pulled into said female die by vacuum after the sheet is engaged with the female die.

9. Method of manufacturing a medical positioner as claimed in claim 8, wherein wherein said configured sheet defines an opening through which the insert is installed in the sheet, and said layer overlies said opening, said layer and said configured sheet having edges sealed to one another to close said opening.

10. Mehod of manufacturing a medical positioner as claimed in claim 9, wherein said configured sheet with the insert installed therein is placed in a form with the opening facing out of the form, placing the layer over the form, and then applying heat and pressure to the edges of the configured sheet and the layer to seal said edges together and close said opening.

* * * * *

UNITED STATES PATENT AND TRADEMARK OFFICE
CERTIFICATE OF CORRECTION

PATENT NO. : 6,190,487 B1
DATED : February 20, 2001
INVENTOR(S) : Kevin E. Laughlin Page 1 of 1

It is certified that error appears in the above-identified patent and that said Letters Patent is hereby corrected as shown below:

Claim 9,
Line 46, delete second "wherein"

Claim 10,
Line 51, delete "Mehod" and insert --Method--

Signed and Sealed this

Seventh Day of August, 2001

*Attest:*

*Nicholas P. Godici*

NICHOLAS P. GODICI
*Attesting Officer*   *Acting Director of the United States Patent and Trademark Office*